United States Patent
Kato

(10) Patent No.: US 12,275,408 B2
(45) Date of Patent: Apr. 15, 2025

(54) VEHICLE CONTROL APPARATUS

(71) Applicant: Honda Motor Co., Ltd., Tokyo (JP)

(72) Inventor: Daichi Kato, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 162 days.

(21) Appl. No.: 18/124,494

(22) Filed: Mar. 21, 2023

(65) Prior Publication Data

US 2023/0311889 A1     Oct. 5, 2023

(30) Foreign Application Priority Data

Mar. 29, 2022 (JP) ................. 2022-052986

(51) Int. Cl.
*B60W 30/18* (2012.01)
*B60W 50/14* (2020.01)
*B60W 60/00* (2020.01)

(52) U.S. Cl.
CPC ...... *B60W 30/18163* (2013.01); *B60W 50/14* (2013.01); *B60W 60/005* (2020.02);
(Continued)

(58) Field of Classification Search
CPC .......... B60W 30/18; B60W 30/18163; B60W 50/00; B60W 50/08; B60W 50/14;
(Continued)

(56) References Cited

U.S. PATENT DOCUMENTS 9,475,491 B1 * 10/2016 Nagasaka ............ B60W 30/16
10,618,519 B2 * 4/2020 Marden ................ B60W 50/14
(Continued)

FOREIGN PATENT DOCUMENTS

CN        107792073 A  *  3/2018 ............ B60W 10/06
CN        112498349 A  *  3/2021 ...... B60W 30/18163
(Continued)

OTHER PUBLICATIONS

Jeong, "Predictive Lane Change Decision Making Using Bidirectional Long Shot-Term Memory for Autonomous Driving on Highways," in IEEE Access, vol. 9, pp. 144985-144998, 2021, doi: 10.1109/ACCESS.2021.3122869. (https://ieeexplore.ieee.org/document/9585616) (Year: 2021).*

(Continued)

*Primary Examiner* — Atul Trivedi
(74) *Attorney, Agent, or Firm* — Duft & Bornsen, PC

(57) ABSTRACT

A vehicle control apparatus includes a microprocessor configured to perform generating an action plan so that the subject vehicle moves from a first lane to a second lane when it is determined that the lane change is necessary. The target route includes a specific road in which the second lane is separated from the first lane up to a first point ahead of a current position, the second lane is adjacent to the first lane from the first point to a second point ahead of the first point, and the second lane is separated from the first lane again behind the second point. The action plan is generated so that the lane change is performed in a section from the first point to the second point, and the lane change is started from a position away from the first point by a predetermined distance ahead.

13 Claims, 6 Drawing Sheets

(52) U.S. Cl.
CPC ... *B60W 2520/10* (2013.01); *B60W 2540/215* (2020.02); *B60W 2552/05* (2020.02); *B60W 2552/10* (2020.02); *B60W 2556/50* (2020.02)

(58) Field of Classification Search
CPC ............ B60W 60/001; B60W 60/005; B60W 2050/0072; B60W 2520/10; B60W 2520/215; B60W 2540/215; B60W 2552/05; B60W 2552/10; B60W 2556/35; B60W 2556/40; B60W 2556/50
USPC .......................................................... 701/26
See application file for complete search history.

(56) References Cited

U.S. PATENT DOCUMENTS

| | | | |
|---|---|---|---|
| 2018/0178714 A1* | 6/2018 | Fujii | B60W 30/16 |
| 2018/0204463 A1* | 7/2018 | Khalifeh | B60W 50/12 |
| 2018/0350242 A1* | 12/2018 | Fujii | B60W 30/18163 |
| 2019/0061765 A1* | 2/2019 | Marden | B60W 30/18163 |
| 2019/0126927 A1* | 5/2019 | Uejima | G05D 1/0212 |
| 2019/0171206 A1* | 6/2019 | Abrams | G01C 21/34 |
| 2020/0114921 A1* | 4/2020 | Simmons | G05D 1/0257 |
| 2020/0406969 A1* | 12/2020 | Ersal | B60W 10/20 |
| 2021/0171042 A1* | 6/2021 | Hayakawa | G08G 1/167 |
| 2022/0105930 A1* | 4/2022 | Kurakami | B60W 50/0097 |
| 2022/0274624 A1* | 9/2022 | Wray | G01C 21/3837 |
| 2022/0276653 A1* | 9/2022 | Wray | G05D 1/0214 |
| 2022/0315037 A1* | 10/2022 | Wankhede | B60W 60/0013 |
| 2022/0348201 A1* | 11/2022 | Ostafew | B60K 26/021 |
| 2023/0145218 A1* | 5/2023 | Murray | G01S 13/931 701/24 |
| 2023/0278562 A1* | 9/2023 | Parks | B60W 60/001 701/532 |
| 2023/0365133 A1* | 11/2023 | Olsson | B60W 30/182 |
| 2024/0001926 A1* | 1/2024 | Singh | B60W 30/16 |
| 2024/0317232 A1* | 9/2024 | Woodbury | B60W 60/001 |

FOREIGN PATENT DOCUMENTS

| | | | | |
|---|---|---|---|---|
| CN | 112672942 A | * | 4/2021 | |
| CN | 112977453 A | * | 6/2021 | ............ B60W 30/08 |
| CN | 113264049 A | * | 8/2021 | ...... B60W 30/18163 |
| CN | 113879307 A | * | 1/2022 | ...... B60W 30/18154 |
| CN | 116424330 A | * | 7/2023 | |
| CN | 118201830 A | * | 6/2024 | ...... B60W 30/18163 |
| DE | 102018107341 A1 | * | 10/2018 | ............ B60K 35/00 |
| DE | 102018107502 A1 | * | 10/2018 | ............ B60K 35/00 |
| DE | 102018107508 A1 | * | 10/2018 | ............ B60K 37/02 |
| DE | 102018221862 A1 | * | 7/2020 | ......... B60W 30/143 |
| DE | 102020133412 A1 | * | 7/2021 | ...... B60W 30/18163 |
| DE | 102017128201 B4 | * | 2/2022 | ............ B60Q 1/346 |
| DE | 112020006404 T5 | * | 11/2022 | ........ B60W 30/0956 |
| DE | 102021125693 A1 | * | 4/2023 | ............ B60W 30/10 |
| DE | 102018108572 B4 | * | 5/2023 | ............ B60W 30/12 |
| DE | 102021213571 A1 | * | 6/2023 | ...... B60W 30/18163 |
| DE | 102023122319 A1 | * | 2/2024 | ............ B60W 30/12 |
| DE | 102023004803 A1 | * | 5/2024 | |
| EP | 3848271 A1 | * | 7/2021 | ............ B60W 30/08 |
| EP | 3832263 B1 | * | 5/2024 | ............ B60W 30/09 |
| FR | 3121411 A1 | * | 10/2022 | ...... B60W 30/18163 |
| GB | 2590155 A | * | 6/2021 | ............ B60W 30/10 |
| JP | 2015161518 A | | 9/2015 | |
| JP | 2018103767 A | | 7/2018 | |
| JP | 2020163927 A | | 10/2020 | |
| JP | 2021082286 A | * | 5/2021 | ...... B60W 30/18163 |
| JP | 2021196874 A | | 12/2021 | |
| RU | 2721635 C1 | * | 5/2020 | ............ B60R 21/00 |
| WO | WO-2019204053 A1 | * | 10/2019 | ............ B60W 30/09 |
| WO | WO-2024108123 A1 | * | 5/2024 | |

OTHER PUBLICATIONS

Paul, et al., "Autonomous Vehicle Lane Change Maneuver: a Comprehensive Analysis," 2024 International Conference on Intelligent and Innovative Technologies in Computing, Electrical and Electronics (IITCEE), Bangalore, India, 2024, pp. 1-6 (https://ieeexplore.ieee.org/document/10467420) (Year: 2024).*

Japanese Office action; Application 2022-052986; Sep. 5, 2023.

* cited by examiner

VEHICLE CONTROL APPARATUS

CROSS-REFERENCE TO RELATED APPLICATION

This application is based upon and claims the benefit of priority from Japanese Patent Application No. 2022-052986 filed on Mar. 29, 2022, the content of which is incorporated herein by reference.

BACKGROUND OF THE INVENTION

Field of the Invention

This invention relates to vehicle control apparatus configured to control traveling of a vehicle.

Description of the Related Art

As this type of device, there has been conventionally known a device that performs lane change assistance control for assisting steering so that a subject vehicle moves from a currently traveling lane to a lane adjacent to the currently traveling lane (see, for example, JP 2018-103767 A). The device described in JP 2018-103767 A starts lane change assistance control when detecting a lane change assistance request based on an operation of an indicator lever by a driver.

Meanwhile, on a road where a lane in which a subject vehicle is traveling and an adjacent lane to which the subject vehicle is to move are separated from each other at a point ahead in the traveling direction, it is necessary to complete a lane change before the point. However, when the lane change assistance control is started simply based on the lane change assistance request as in the device described in JP 2018-103767 A, there is a possibility that the lane change cannot be completed at a certain position at which the lane change assistance request is detected.

SUMMARY OF THE INVENTION

An aspect of the present invention is a vehicle control apparatus including: a microprocessor and a memory coupled to the microprocessor. The microprocessor is configured to perform: acquiring a target route of a subject vehicle traveling in a self-drive mode from map information based on a current position and a destination of the subject vehicle; determining based on a target route whether a lane change is necessary to change a traveling lane of the subject vehicle from a first lane in which the subject vehicle is currently traveling to a second lane; generating an action plan so that the subject vehicle moves from the first lane to the second lane when it is determined in the determining that the lane change is necessary; and controlling an actuator for traveling based on the action plan generated in the generating. The target route includes a specific road in which the second lane is separated from the first lane up to a first point ahead of a current position in a traveling direction, the second lane is adjacent to the first lane from the first point to a second point ahead of the first point in the traveling direction, and the second lane is separated from the first lane again behind the second point. The microprocessor is configured to perform the generating including, when it is determined by the determination unit that the lane change is necessary on the specific road, generating the action plan so that the lane change is performed in a section from the first point to the second point, and the lane change is started from a position away from the first point by a first predetermined distance ahead in the traveling direction.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, embodiments of the present invention will be described with reference to FIGS. 1 to 5. A vehicle control apparatus according to the embodiment of the present invention can be applied to a vehicle having a self-driving capability, that is, a self-driving vehicle. A vehicle to which the vehicle control apparatus according to the present embodiment is applied may be referred to as a subject vehicle to be distinguished from other vehicles. The subject vehicle may be any of an engine vehicle having an internal combustion (engine) as a traveling drive source, an electric vehicle having a traveling motor as a traveling drive source, and a hybrid vehicle having an engine and a traveling motor as traveling drive sources. The subject vehicle can travel not only in a self-drive mode in which driving operation by a driver is unnecessary, but also in a manual drive mode with driving operation by the driver.

Figure 1:
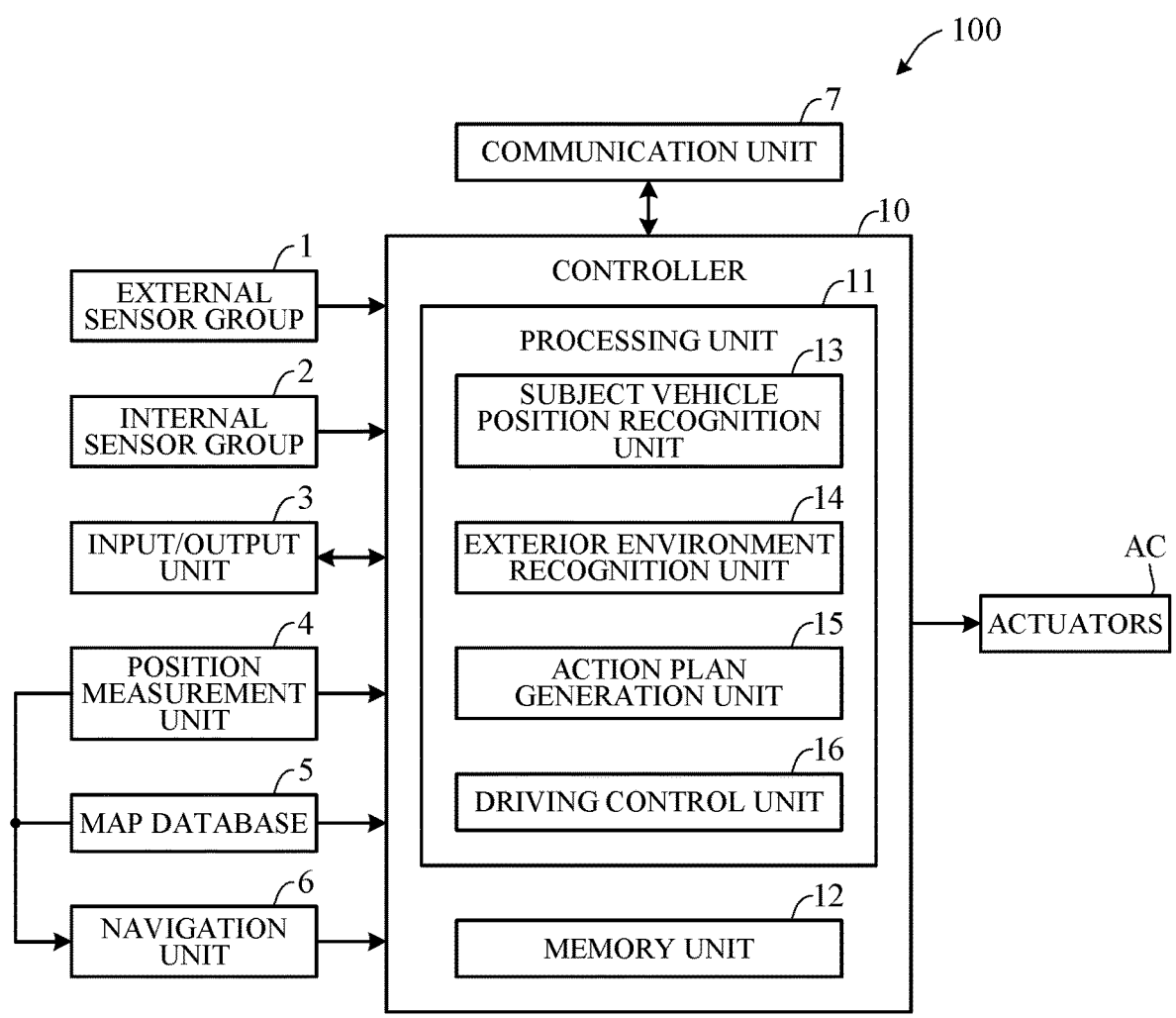
FIG. 1 is a block diagram schematically illustrating an overall configuration of a vehicle control system including a vehicle control apparatus according to the embodiment of the present invention.

FIG. 1 is a block diagram schematically illustrating an overall configuration of a vehicle control system 100 including a vehicle control apparatus according to the embodiment of the present invention. As illustrated in FIG. 1, the vehicle control system 100 mainly includes a controller 10, and an external sensor group 1, an internal sensor group 2, an input/output device 3, a position measurement unit 4, a map database 5, a navigation unit 6, a communication unit 7, and actuators AC each communicably connected to the controller 10 via a CAN communication line or the like.

The external sensor group 1 is a generic term for a plurality of sensors (external sensors) that detect an external situation which is peripheral information of the subject vehicle. For example, the external sensor group 1 includes a LiDAR that detects a position (a distance or a direction from the subject vehicle) of an object around the subject vehicle by irradiating laser light and detecting reflected light, a radar that detects a position of an object around the subject vehicle by irradiating electromagnetic waves and detecting reflected waves, and a camera that has an imaging element such as a CCD or a CMOS and captures an image around the subject vehicle (forward, rearward, and sideward directions).

The internal sensor group 2 is a generic term for a plurality of sensors (internal sensors) that detect a traveling state of the subject vehicle. For example, the internal sensor group 2 includes a vehicle speed sensor that detects a vehicle speed of the subject vehicle, an acceleration sensor that detects an acceleration in front-rear and left-right directions of the subject vehicle, a rotation speed sensor that detects a rotation speed of the traveling drive source, and the like. The internal sensor group 2 further includes a sensor that detects driver's driving operation in a manual drive mode, for example, operation of an accelerator pedal, operation of a brake pedal, operation of a steering wheel, and the like.

The input/output device 3 is a generic term for devices to which a command is input from a driver or from which information is output to the driver. For example, the input/output device 3 includes various switches to which the driver inputs various commands by operating operation members (including switches, buttons, and the like provided on the steering wheel), a microphone to which the driver inputs a command by voice, a display that provides information to the driver via a display image, a speaker that provides information to the driver by voice, and the like. The display displays, for example, information for prompting the driver to operate the steering wheel (hands-on) and information for pre-noticing and notifying switching to the manual drive mode.

The position measurement unit (GNSS unit) 4 includes a position measurement sensor that receives a position measurement signal transmitted from a position measurement satellite. The position measurement sensor can also be included in the internal sensor group 2. The position measurement satellite is an artificial satellite such as a global positioning system (GPS) satellite or a quasi-zenith satellite. The position measurement unit 4 measures a current position (latitude, longitude, and altitude) of the subject vehicle using position measurement information received by the position measurement sensor.

The map database 5 is a device that stores general map information used in the navigation unit 6, and is constituted by, for example, a hard disk or a semiconductor element. The map information includes road position information, information on a road shape (curvature or the like), and position information on an intersection or a branch point. The map information stored in the map database 5 is different from highly accurate map information stored in a memory unit 12 of the controller 10.

The navigation unit 6 is a device that searches for a target route on a road to a destination input by a driver and provides guidance along the target route. The input of the destination and the guidance along the target route are performed via the input/output device 3. The target route is calculated based on a current position of the subject vehicle measured by the position measurement unit 4 and the map information stored in the map database 5. The current position of the subject vehicle can be measured using values detected by the external sensor group 1, and the target route may be calculated based on the current position and the highly accurate map information stored in the memory unit 12.

The communication unit 7 communicates with various servers (not illustrated) via a network including a wireless communication network represented by the Internet network, a mobile phone network, or the like, and acquires map information, travel history information, traffic information, and the like from the servers periodically or at a certain timing. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the memory unit 12, and the map information is updated. It is also possible to communicate with other vehicles via the communication unit 7.

The actuators AC are traveling actuators for controlling traveling of the subject vehicle. In a case where the traveling drive source is an engine, the actuators AC include a throttle actuator that adjusts an opening (throttle opening) of a throttle valve of the engine. In a case where the traveling drive source is a traveling motor, the traveling motor is included in the actuators AC. The actuators AC also include a brake actuator that operates a braking device of the subject vehicle and a steering actuator that drives a steering device.

The controller 10 includes an electronic control unit (ECU). More specifically, the controller 10 includes a computer including a processing unit 11 such as a CPU (microprocessor), a memory unit 12 such as a ROM or a RAM, and other peripheral circuits (not illustrated) such as an I/O interface. Although a plurality of ECUs having different functions such as an engine control ECU, a traveling motor control ECU, and a braking device ECU can be separately provided, in FIG. 1, the controller 10 is illustrated as a set of these ECUs for convenience.

The memory unit 12 stores highly accurate road map information. The road map information includes road position information, information on a road shape (curvature or the like), information on a road gradient, position information on an intersection or a branch point, information on the number of lanes, a width of a lane and position information for each lane (information on a center position of a lane or a boundary line of a lane position), position information on a landmark (a traffic light, a sign, a building, or the like) as a mark on a map, and information on a road surface profile such as unevenness of a road surface. The map information stored in the memory unit 12 includes map information acquired from the outside of the subject vehicle via the communication unit 7 and map information created by the subject vehicle itself using values detected by the external sensor group 1 or values detected by the external sensor group 1 and the internal sensor group 2. The memory unit 12 also stores travel history information including values detected by the external sensor group 1 and the internal sensor group 2 in association with map information.

The processing unit 11 includes a subject vehicle position recognition unit 13, an exterior environment recognition unit 14, an action plan generation unit 15, and a driving control unit 16 as functional components.

The subject vehicle position recognition unit 13 recognizes a position of the subject vehicle (subject vehicle position) on a map, based on the position information of the subject vehicle obtained by the position measurement unit 4 and the map information of the map database 5. The subject vehicle position may be recognized using the map information stored in the memory unit 12 and the peripheral information of the subject vehicle detected by the external sensor group 1, and as a result, the subject vehicle position can be recognized with high accuracy. When the subject vehicle position can be measured by a sensor installed on a road or outside a road side, the subject vehicle position can be recognized by communicating with the sensor via the communication unit 7.

The exterior environment recognition unit 14 recognizes an external situation around the subject vehicle based on the signal from the external sensor group 1 such as a LiDAR, a radar, and a camera. For example, the position, speed, and acceleration of a surrounding vehicle (a forward vehicle or a rearward vehicle) traveling around the subject vehicle, the position of a surrounding vehicle stopped or parked around the subject vehicle, the positions and states of other objects and the like are recognized. Other objects include signs, traffic lights, markings such as division lines and stop lines of roads, buildings, guardrails, utility poles, signboards, pedestrians, bicycles, and the like. The states of other objects include a color of a traffic light (red, green, yellow), and the moving speed and direction of a pedestrian or a bicycle.

The action plan generation unit 15 generates a driving path (target path) of the subject vehicle from a current point of time to a predetermined time ahead based on, for example, the target route calculated by the navigation unit 6, the map information stored in the memory unit 12, the subject vehicle position recognized by the subject vehicle position recognition unit 13, and the external environment recognized by the exterior environment recognition unit 14. When there are a plurality of paths that are candidates for the target path on the target route, the action plan generation unit 15 selects, from among the plurality of paths, an optimal path that satisfies criteria such as compliance with laws and regulations, and efficient and safe traveling, and sets the selected path as the target path. Then, the action plan generation unit 15 generates an action plan corresponding to the generated target path. The action plan generation unit 15 generates various action plans corresponding to traveling modes, such as overtaking traveling for overtaking a preceding vehicle, lane change traveling for changing a traveling lane, following traveling for following a preceding vehicle, lane keeping traveling for keeping the lane so as not to deviate from the travel lane, deceleration traveling, acceleration traveling, or the like. When generating the target path, the action plan generation unit 15 first determines a travel mode and generates the target path based on the travel mode.

In the self-drive mode, the driving control unit 16 controls each of the actuators AC such that the subject vehicle travels along the target path generated by the action plan generation unit 15. More specifically, the driving control unit 16 calculates a requested driving force for obtaining a target acceleration for each unit time calculated by the action plan generation unit 15 in consideration of travel resistance determined by a road gradient or the like in the self-drive mode. Then, for example, the actuators AC are feedback-controlled so that an actual acceleration detected by the internal sensor group 2 becomes the target acceleration. More specifically, the actuators AC are controlled so that the subject vehicle travels at the target vehicle speed and the target acceleration. When the drive mode is the manual drive mode, the driving control unit 16 controls each of the actuators AC in accordance with a travel command (steering operation or the like) from the driver, acquired by the internal sensor group 2.

Figure 2A:
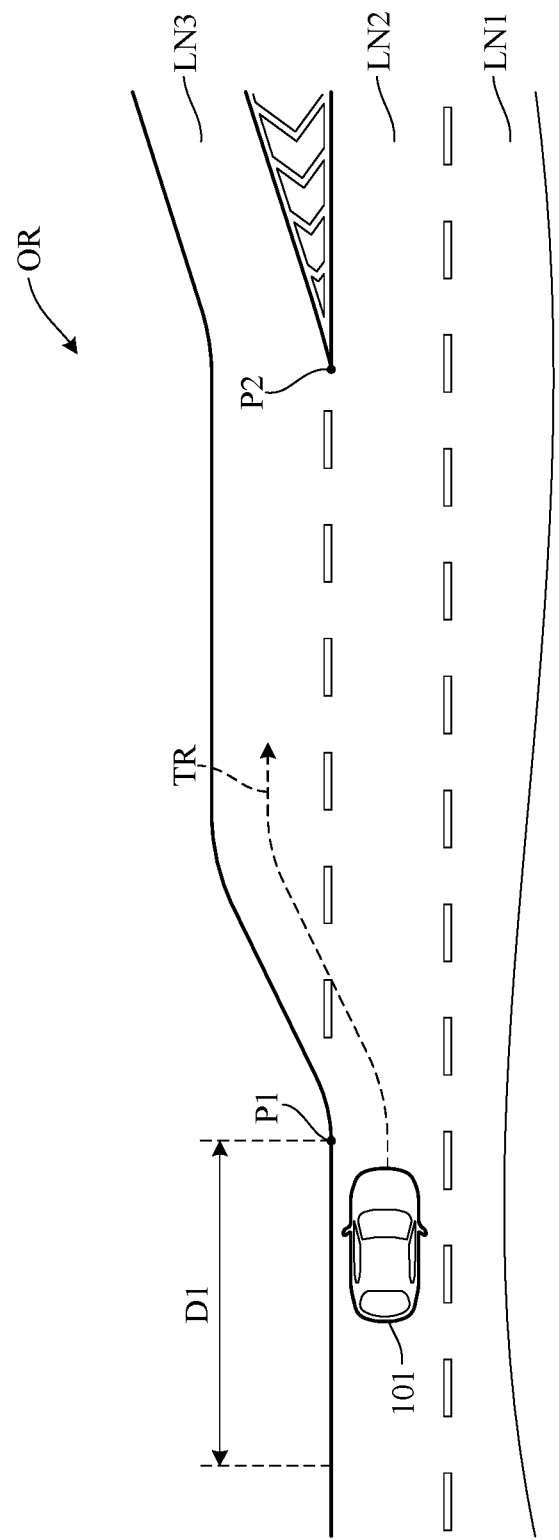
FIG. 2A is a diagram illustrating an example of a branching road.

Meanwhile, in a scene where a subject vehicle 101 travels on a branching road as shown in FIG. 2A in the self-drive mode, when it is determined that the subject vehicle 101 needs to move from a current lane LN2 to another lane LN3 based on the target route calculated by the navigation unit 6, the action plan generation unit 15 generates a target path as shown by a broken line TR so that the subject vehicle 101 starts a lane change from a point P1. The point P1 is a branch start position at which the current lane LN2 and the another lane LN3 diverge. The driving control unit 16 controls the actuators AC so that the subject vehicle 101 travels on the target path. As a result, the subject vehicle 101 can automatically move to the another lane LN3.

A mode of lane change that is automatically performed (hereinafter referred to as an automatic lane change mode) includes a fully-automatic lane change mode in which the action plan generation unit 15 generates an action plan for lane change and the driving control unit 16 determines to start the lane change based on the action plan, and a semi-automatic lane change mode in which the action plan generation unit 15 generates an action plan for lane change and an occupant of the subject vehicle 101 instructs to start the lane change. Hereinafter, the semi-automatic lane change mode will be simply referred to by the automatic lane change mode.

Figure 2B:
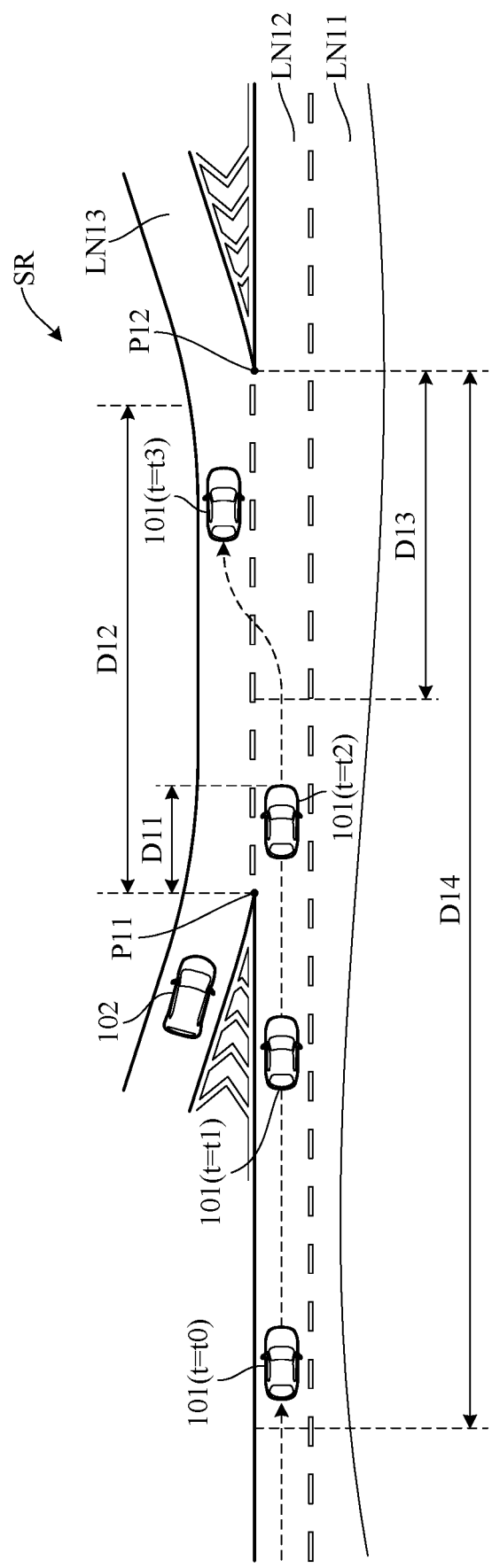
FIG. 2B is a diagram illustrating another example of the branching road.

On the other hand, when the subject vehicle 101 travels in the self-drive mode, the target path generated by the action plan generation unit 15 may include a road (hereinafter referred to as the specific branching road or the specific road) SR including a merging lane and a branching lane as illustrated in FIG. 2B as well as the branching road (hereinafter referred to as the normal branching road) as illustrated in FIG. 2A. The specific branching road SR has a road structure in which the another lane (lane LN13) is separated from the current lane (lane LN12) up to a point P11, the another lane LN13 is adjacent to the current lane LN12 from the point P11 to a point P12 ahead of the point P11 in the traveling direction, and the another lane LN13 is separated from the current lane LN12 again behind the point P12.

In the specific branching road SR of FIG. 2B, when the subject vehicle 101 changes a lane for moving from the current lane LN12 to the another lane LN13 in a section (hereinafter referred to as the adjacent section) from the point P11 to the point P12, it is necessary to complete the lane change in the adjacent section. In the automatic lane change mode, when recommendation information for recommending the occupant of the subject vehicle 101 to change a lane is notified to the occupant and an operation for approval (start instruction) is received from the occupant via the input/output device 3, the control of the actuators AC is started such that the subject vehicle 101 automatically changes the lane. In a case where a lane change is performed in the automatic lane change mode on the specific branching road SR of FIG. 2B, if a timing of a start instruction from the occupant is delayed, it is difficult to complete the lane change in good time in the adjacent section. Furthermore, on the specific branching road SR of FIG. 2B, when the subject vehicle 101 moves from the current lane LN12 to the another lane LN13, there is a risk that the subject vehicle 101 approaches or collides with another vehicle traveling in the another lane LN13. In particular, since it is difficult to recognize a vehicle traveling at a position before the point P11, such as another vehicle 102, from the subject vehicle 101 side, when the subject vehicle 101 tries to move to the another lane LN13 immediately after passing the point P11 as in the normal branching road, there is a risk that the subject vehicle 101 approaches or collides with the another vehicle 102. Therefore, in the present embodiment, in order to cope with such a problem, a vehicle control apparatus is configured as follows.

Figure 3:
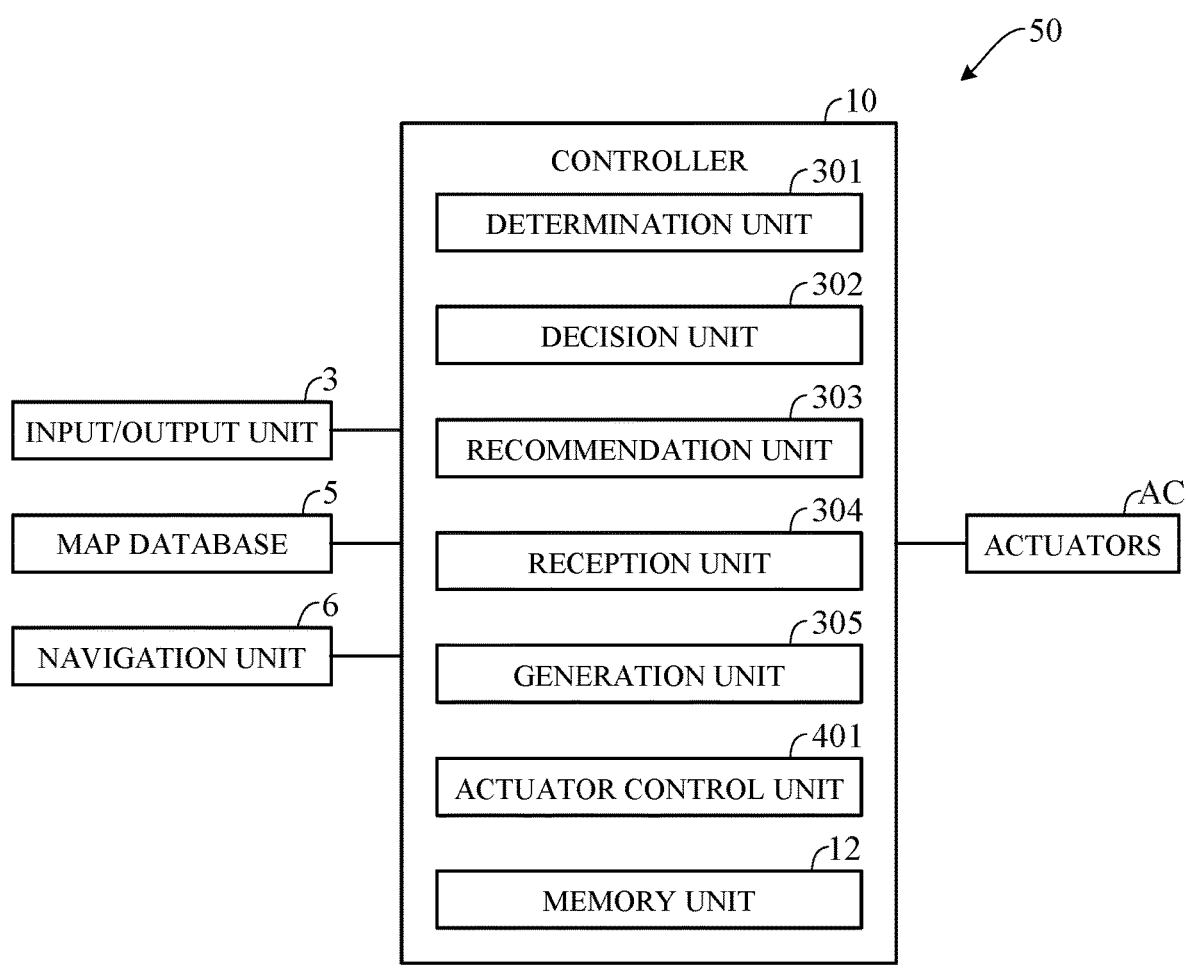
FIG. 3 is a block diagram illustrating a schematic configuration of the vehicle control apparatus according to the embodiment of the present invention.

FIG. 3 is a block diagram illustrating a schematic configuration of a vehicle control apparatus 50 according to the embodiment of the present invention, and illustrates a configuration when the subject vehicle 101 mainly travels in a self-drive mode. The vehicle control apparatus 50 is included in the vehicle control system 100 of FIG. 1. As illustrated in FIG. 3, the vehicle control apparatus 50 includes an input/output device 3, a map database 5, a navigation unit 6, and a controller 10.

The controller 10 of FIG. 3 includes a determination unit 301, a decision unit 302, a recommendation unit 303, a reception unit 304, a generation unit 305, an actuator control unit 401, and a memory unit 12 as functional components. The determination unit 301, the decision unit 302, the recommendation unit 303, the reception unit 304, and the generation unit 305 constitute a part of the action plan generation unit 15 in FIG. 1, and the actuator control unit 401 constitutes a part of the driving control unit 16.

The determination unit 301 acquires a target route of the subject vehicle 101 from the map information. More specifically, the determination unit 301 acquires a target route calculated by the navigation unit 6 based on a current position and a destination of the subject vehicle 101. The determination unit 301 determines whether the acquired target route includes a branching road and whether the subject vehicle 101 needs to change a lane on the branching road. Further, the determination unit 301 determines whether the branching road is a normal branching road or a specific branching road including a merging lane and a branching lane.

When the determination unit 301 determines that the branching road is a normal branching road, the decision unit 302 decides the mode of lane change to be an automatic lane change mode to be applied to a lane change on the normal branching road (hereinafter referred to as the normal lane change mode). On the other hand, when the determination unit 301 determines that the branching road is a specific branching road, the decision unit 302 decides whether a length of an adjacent section in the specific branching road is equal to or greater than a predetermined distance D12 based on the map information stored in the map database 5 or the memory unit 12. When the length of the adjacent section is equal to or greater than the predetermined distance D12, the decision unit 302 decides the mode of lane change to be an automatic lane change mode to be applied to a lane change on the specific branching road (hereinafter referred to as the specific lane change mode). On the other hand, when the length of the adjacent section is smaller than the predetermined distance D12, the decision unit 302 decides the mode of lane change to be a manual lane change mode. Specifically, when the length of the adjacent section is smaller than the predetermined distance D12, the decision unit 302 determines that it is not possible to automatically change a lane, notifies the occupant of the subject vehicle 101 of screen information and audio information for requesting the occupant to put his/her hands on the steering wheel via the input/output device 3, and urges the occupant of the subject vehicle 101 to manually change the lane. Thereafter, the decision unit 302 switches the drive mode of the subject vehicle 101 to the manual drive mode before the subject vehicle 101 reaches the point P11.

When the decision unit 302 decides the mode of lane change to be the automatic lane change mode (the normal lane change mode or the specific lane change mode), the recommendation unit 303 notifies the occupant of the subject vehicle 101 of recommendation information for recommending the occupant to change a lane via the input/output device 3. The recommendation information includes audio information and image information for notifying the occupant of the subject vehicle 101 that there is a branching road ahead in the traveling direction of the subject vehicle 101, that a lane change is started by performing a predetermined approval operation, or the like. The predetermined approval operation is, for example, an operation of pressing a predetermined switch or button provided on the steering wheel in a hands-on state. The hands-on state may be detected by a capacitance sensor provided in the steering wheel as a part of the internal sensor group 2, or may be detected by another method.

When the decision unit 302 decides the mode of lane change to be the specific lane change mode, the recommendation unit 303 starts notification of recommendation information from a position away from a branch end position (the point P12 in FIG. 2B) by a predetermined distance D14 (>the length of the adjacent section) toward the opposite side (backward) of the traveling direction. On the other hand, when the decision unit 302 decides the mode of lane change to be the normal lane change mode, notification of recommendation information is started from a position away from a branch start position (the point P1 in FIG. 2A) by a predetermined distance D1 toward the opposite side of the traveling direction. The reception unit 304 receives an operation for approval (start instruction) from the occupant in response to the recommendation of the lane change via the input/output device 3. The predetermined distance D1 and the predetermined distance D14 are set to have sufficient lengths in consideration of an approval limit position, which will be described below, so that the occupant of the subject vehicle 101 can perform an approval operation in good time.

When the reception unit 304 receives the approval operation, the generation unit 305 generates an action plan for lane change. When the decision unit 302 decides the mode of lane change to be the specific lane change mode, that is, when the branching road is a specific branching road, the generation unit 305 generates an action plan such that the lane change corresponding to the specific branching road is performed. For example, in the travel scene of FIG. 2B, when the subject vehicle 101 is traveling at a position before the specific branching road SR in the traveling direction, recommendation information is notified to the occupant of the subject vehicle 101 (t=t0), and when an approval operation from the occupant is received (t=t1), the generation unit 305 generates an action plan so that a lane change is started when the subject vehicle 101 reaches a position away from the point P11 by the predetermined distance D11 ahead in the traveling direction (t=t2). In addition, the generation unit 305 generates the action plan so that the lane change from the current lane LN12 to the another lane LN13 is completed before the subject vehicle 101 reaches the point P12 (t=t3). In FIG. 2B, a driving path of the subject vehicle 101 from the time t0 to the time t3 is indicated by a broken line arrow. Since the subject vehicle 101 starts the lane change in a while after passing through the point P11 as described above, it is possible to recognize whether there is another vehicle (such as the another vehicle 102 in FIG. 2B) traveling in the lane LN13 and a traveling speed and a traveling position of the another vehicle before the lane change is started. As a result, the subject vehicle 101 can smoothly change a lane on the specific branching road SR while avoiding an approach to or a collision with another vehicle traveling in the lane LN13. On the other hand, when the decision unit 302 decides the mode of lane change to be the normal lane change mode, that is, when the branching road is a normal branching road, the generation unit 305 generates an action plan such that the lane change corresponding to the normal branching road is performed. More specifically, the generation unit 305 generates an action plan such that the lane change is started immediately after the subject vehicle 101 passes the branch start position.

In addition, even though the decision unit 302 decides the mode of lane change to be the automatic lane change mode, the generation unit 305 generates an action plan so that the subject vehicle 101 continues to travel in the current lane LN12 when the reception unit 304 does not receive an approval operation before the subject vehicle 101 reaches the approval limit position. The actuator control unit 401 controls the actuators AC based on the action plan. As a result, the subject vehicle 101 continues to travel in the current travel lane in the self-drive mode. The approval limit position is set to the branch start position (the point P1 in FIG. 2A) in the normal lane change mode, and is set to the position away from and before the branch end position (the point P12 in FIG. 2B) by a predetermined distance D13 in the specific lane change mode. The predetermined distance D13 is set in advance to a length enough to complete the lane change in good time before the subject vehicle 101 reaches the branch end position. When the traveling speed of the subject vehicle 101 at a recommendation start time (t=t0) is equal to or higher than a predetermined speed, the generation unit 305 may change the approval limit position according to the traveling speed of the subject vehicle 101. Specifically, the approval limit position may be set to a position farther away toward the opposite side of the traveling direction as the traveling speed of the subject vehicle 101 at the recommendation start time (t=t0) is higher. That is, the predetermined distance D13 may increase.

When the decision unit 302 decides the mode of lane change to be the manual lane change mode, the actuator control unit 401 controls the actuators AC in accordance with a driving operation of the occupant of the subject vehicle 101. As a result, the lane change is manually performed.

Figure 4:
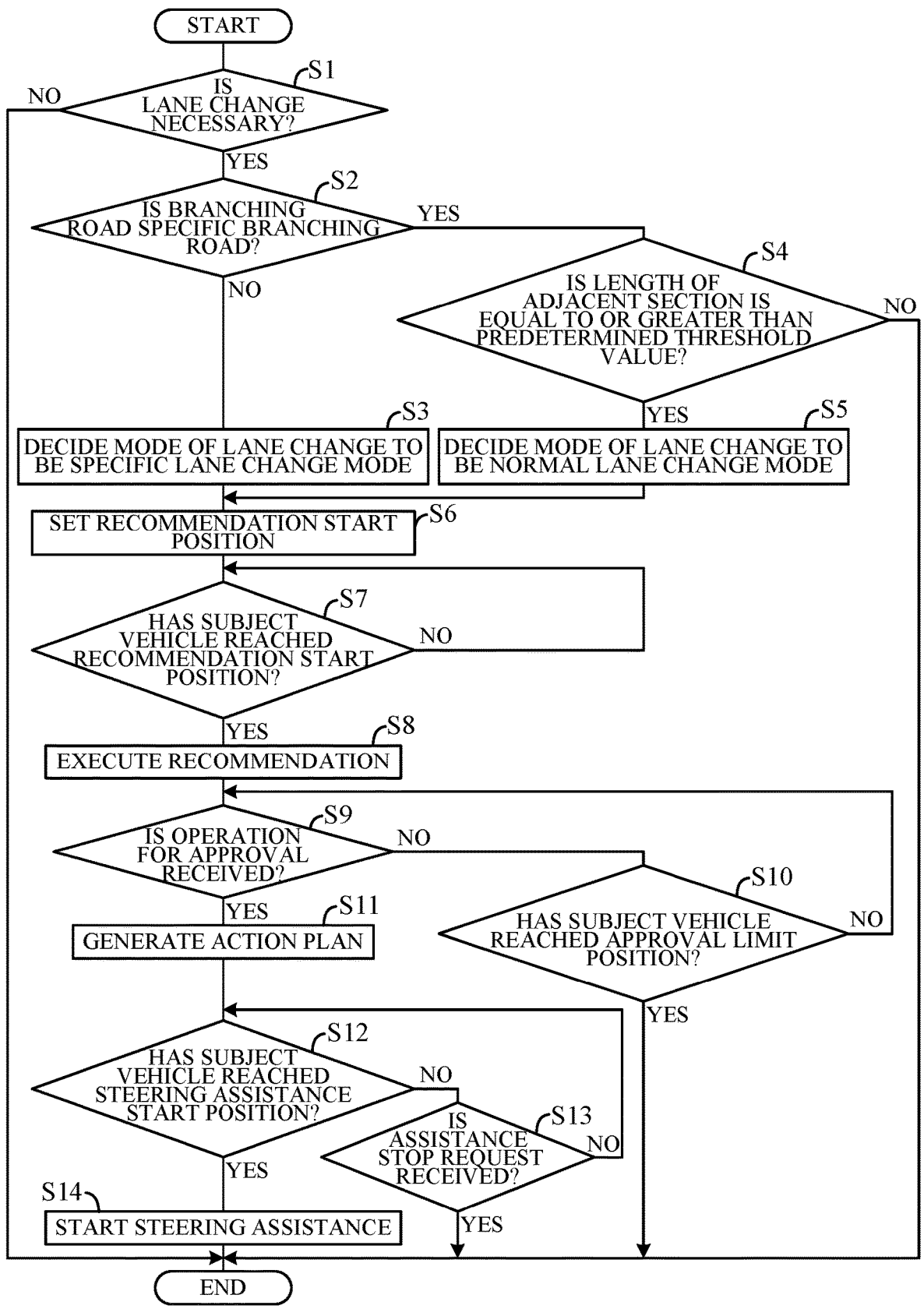
FIG. 4 is a flowchart illustrating an example of processing executed by the controller in FIG. 3.

FIG. 4 is a flowchart illustrating one example of processing executed by the controller 10 in FIG. 3 in accordance with a predetermined program. The processing illustrated in the flowchart of FIG. 4 is repeated, for example, at every predetermined cycle when the subject vehicle 101 travels in the self-drive mode.

First, in step S1, it is determined whether it is required to change a lane on a branching road based on a target route calculated by the navigation unit 6 and a subject vehicle position. If NO in step S1, the processing ends. If YES in step S1, it is determined in step S2 whether the branching road is a specific branching road, that is, whether the branching road includes a merging lane. If NO in step S2, that is, when the branching road is a normal branching road as illustrated in FIG. 2A, the mode of lane change is decided to be a normal lane change mode in step S3, and the processing proceeds to step S6. If YES in step S2, that is, when the branching road is a specific branching road as illustrated in FIG. 2B, it is determined in step S4 whether a length of an adjacent section on the branching road is equal to or greater than a predetermined distance D12. If YES in step S4, the mode of lane change is decided to be a specific lane change mode in step S5, and the processing proceeds to step S6. If NO in step S4, the processing ends. In this case, a lane change in the manual lane change mode, that is, a lane change according to a driving operation of the occupant of the subject vehicle 101, is performed.

In step S6, a recommendation start position is set. When the branching road is a normal branching road, the recommendation start position is set to a position away from a branch start position (the point P1 in FIG. 2A) by a predetermined distance D1 toward the opposite side of the traveling direction of the subject vehicle 101. On the other hand, when the branching road is a specific branching road, the recommendation start position is set to a position away from a branch end position (the point P12 in FIG. 2B) by a predetermined distance D14 toward the opposite side of the traveling direction of the subject vehicle 101. In step S7, it is determined whether the subject vehicle 101 has reached the recommendation start position. Step S7 is repeated until it is determined the subject vehicle 101 has reached the recommendation start position. If YES in step S7, the recommendation information is notified to the occupant via the input/output device 3 in step S8.

In step S9, it is determined whether an operation for approval (start instruction) from the occupant is received via the input/output device 3. If NO in step S9, it is determined in step S10 whether the subject vehicle 101 has reached the approval limit position. If NO in step S10, the processing returns to step S9. If YES in step S10, the processing ends. In this case, steering assistance is not performed, and the subject vehicle 101 continues to travel in the current travel lane in the self-drive mode. If YES in step S9, an action plan is generated in step S11.

In step S12, it is determined whether the subject vehicle 101 has reached a steering assistance start position indicated by the action plan. The steering assistance start position is set based on a traveling speed of the subject vehicle 101 and a length of the adjacent section such that a lane change of the subject vehicle 101 is completed at a position before the branch point. In the normal lane change mode, the steering assistance start position is set to the branch start position so that the subject vehicle 101 starts a lane change immediately after passing the branch start position (the point P1 in FIG. 2A) of the normal branching road. On the other hand, in the specific lane change mode, the steering assistance start position is set to a position away from the branch start position of the specific branching road (the point P11 in FIG. 2B) by a predetermined distance D11 ahead in the traveling direction. Even when an approval operation from the occupant is received at a position before the steering assistance start position, a lane change approving state is maintained until the subject vehicle 101 reaches the steering assistance start position, and the lane change is started when the subject vehicle 101 passes the steering assistance start position.

If NO in step S12, it is determined in step S13 whether a steering assistance cancelling operation (hereinafter referred to as the assistance stop request) is received via the input/output device 3. The assistance stop request may be made by an operation of pressing a predetermined switch or button provided on the steering wheel in the hands-on state, or may be made by another operation. If NO in step S13, the processing returns to step S12. If YES in step S13, the processing ends. In this case, steering assistance is not performed, and the subject vehicle 101 continues to travel in the current travel lane in the self-drive mode. If YES in step S12, steering assistance is started in step S14. More specifically, the actuators AC are controlled so that the subject vehicle 101 moves to a change destination lane according to the action plan generated in step S11.

According to the present embodiment, the following operational effects can be achieved.

(1) A vehicle control apparatus 50 includes: a determination unit 301 that acquires a target route of a subject vehicle 101 traveling in a self-drive mode from map information based on a current position and a destination of the subject vehicle 101, and determines based on the target route whether a lane change is necessary to change a traveling lane of the subject vehicle 101 from a first lane in which the subject vehicle 101 is currently traveling to a second lane; a generation unit 305 that generates an action plan so that the subject vehicle 101 moves from the first lane to the second lane when the determination unit 301 determines that the lane change is necessary; and an actuator control unit that controls actuators AC based on the action plan generated by the generation unit 305. The target route includes a specific road (the specific branching road SR in FIG. 2B) in which the second lane (the lane LN13 in FIG. 2B) is separated from the first lane (the lane LN12 in FIG. 2B) up to a first point (the point P11 in FIG. 2B) ahead of a current position in a traveling direction, the second lane is adjacent to the first lane from the first point to a second point (the point P12 in FIG. 2B) ahead of the first point in the traveling direction, and the second lane is separated from the first lane again behind the second point. When the determination unit 301 determines that the lane change is necessary on the specific road, the generation unit 305 generates the action plan (first action plan) so that the lane change is performed in a section from the first point to the second point, and the lane change is started from a position away from the first point by a first predetermined distance (the predetermined distance D11 in FIG. 2B) ahead in the traveling direction. As a result, another vehicle traveling in a lane to which the subject vehicle is to move can be recognized before the lane change is started, and the subject vehicle can smoothly move in an adjacent section even on the specific branching road as illustrated in FIG. 2B.

(2) The vehicle control apparatus 50 further includes: an input/output device 3 that inputs and outputs information; a decision unit 302 that decides a mode of lane change to be a first mode (automatic lane change mode) in which the lane change is automatically performed based on the action plan (first action plan) generated by the generation unit 305 when a length of the section (adjacent section) from the first point to the second point is equal to or greater than a second predetermined distance (the predetermined distance D12 in FIG. 2B), and decides the mode of lane change to be a second mode (manual lane change mode) in which the lane change is manually performed according to a driving operation of an occupant of the subject vehicle 101 when the length of the section from the first point to the second point is smaller than the second predetermined distance; a recommendation unit 303 that notifies the occupant of the subject vehicle 101 via the input/output device 3 of recommendation information for recommending the lane change to the occupant when the decision unit 302 decides the mode of lane change to be the first mode; and a reception unit 304 that receives an approval operation in response to the recommendation of the lane change from the occupant via the input/output device 3. When the reception unit 304 receives the approval operation, the actuator control unit 401 controls a traveling actuator based on the action plan (first action plan) generated by the generation unit 305. Therefore, when the adjacent section does not have a sufficient length for automatically performing the lane change, the drive mode can be switched to the manual drive mode before the subject vehicle enters the specific branching road. As a result, traffic safety on the branching road can be improved.

(3) Even though the decision unit 302 decides the mode of lane change to be the first mode, the generation unit 305 generates the action plan (second action plan) so that the subject vehicle 101 continues to travel in the first lane when the reception unit 304 does not receive an approval operation before a distance between the subject vehicle 101 and the second point becomes smaller than a third predetermined distance (the predetermined distance D13 in FIG. 2B). The actuator control unit 401 controls the actuators AC based on the action plan (second action plan) generated by the generation unit 305. By setting a limit position of approval for the recommendation information as described above, it is possible to prevent a lane change that cannot be completed before reaching a branch end position.

(4) When the decision unit 302 decides the mode of lane change to be the first mode, the recommendation unit 303 starts notification of the recommendation information when the subject vehicle 101 reaches a position before the second point by a fourth predetermined distance (the predetermined distance D14 in FIG. 2B). As a result, even on the branching road as illustrated in FIG. 2B, a lane can be automatically changed in good time.

Figure 5:
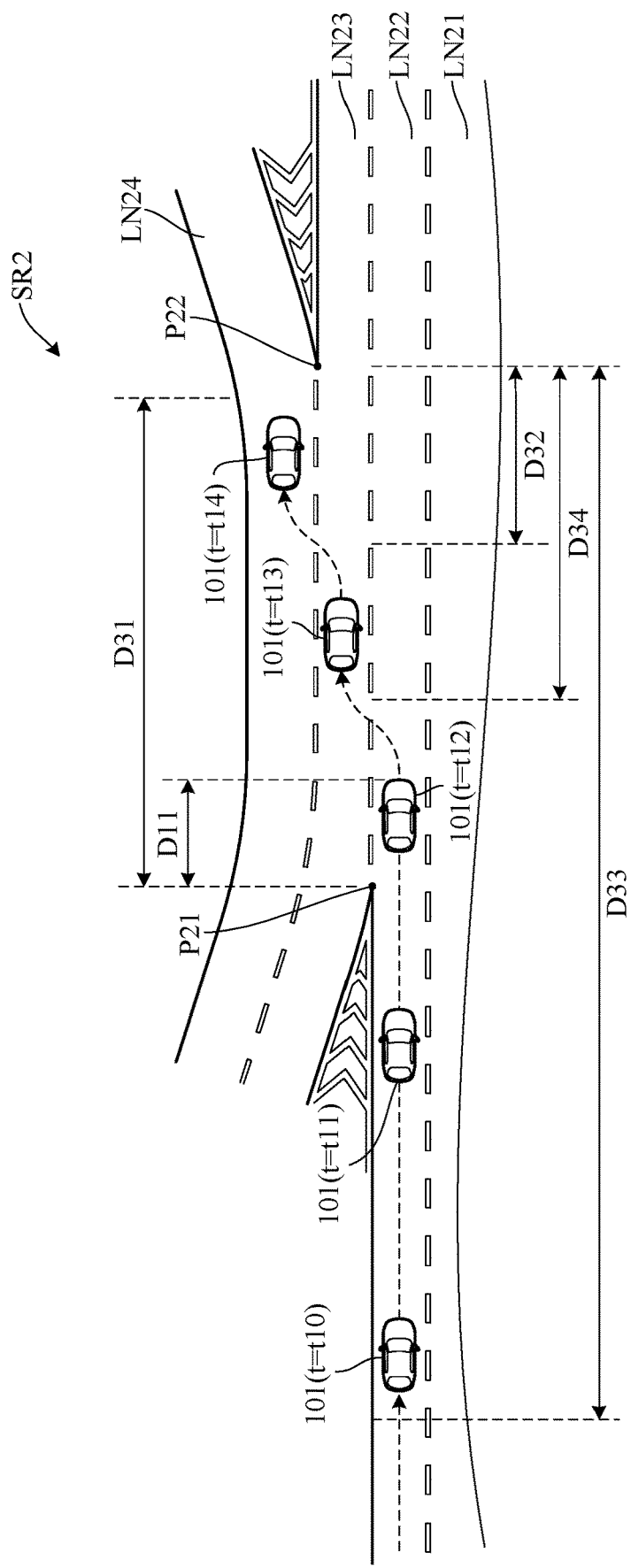
FIG. 5 is a diagram illustrating another example of the branching road.

The above-described embodiment can be modified into various forms. Some modifications will be described below. In the above-described embodiment, the case where the lane change is performed once in the adjacent section on the specific branching road as illustrated in FIG. 2B (hereinafter referred to as the first specific branching road or the first specific road) SR has been described as an example. However, in a certain structure of the specific branching road, the lane change in the adjacent section may be required multiple times. FIG. 5 is a diagram illustrating another example of the specific branching road. On the specific branching road illustrated in FIG. 5 (hereinafter referred to as the second specific branching road or the second specific road) SR2, a second lane (lane LN24 in FIG. 5) is separated from a first lane (lane LN22 in FIG. 5) up to a third point (branch start position (point P21) in FIG. 5), a third lane (lane LN23 in FIG. 5) adjacent to the first lane is adjacent to the second lane from the third point up to a fourth point (branch end position (point P22) in FIG. 5) ahead of the third point in the traveling direction, and the second lane is separated from the third lane behind fourth point. Such a branching road requires a first lane change in which the subject vehicle 101 moves from the first lane to the third lane and a second lane change in which the subject vehicle 101 moves from the third lane to the second lane.

Therefore, when the determination unit 301 determines that a lane change is necessary to change a traveling lane of the subject vehicle 101 from the first lane (lane LN22) to the second lane (lane LN24) on the specific branching road SR2 as illustrated in FIG. 5, the generation unit 305 generates an action plan so that the subject vehicle 101 moves from the first lane (lane LN22) to the second lane (lane LN24) via the third lane (lane LN23) in the adjacent section from the third point (point P21) to the fourth point (point P22) for the lane change, and the lane change is started from a position away from the third point (point P21) by a first predetermined distance (predetermined distance D11) ahead in the traveling direction. For example, in the travel scene of FIG. 5, when the subject vehicle 101 is traveling in the lane LN22 at a position before the specific branching road SR2 in the traveling direction, recommendation information is notified to the occupant of the subject vehicle 101 (t=t10), and when an approval operation from the occupant is received (t=t11), the generation unit 305 generates an action plan so that a first lane change is started when the subject vehicle 101 reaches a position away from the point P21 by the predetermined distance D11 ahead in the traveling direction (t=t12). Since the subject vehicle 101 starts the lane change in a while after passing through the point P21 as described above, it is possible to recognize other vehicles traveling in the lanes LN23 and LN24. In addition, the generation unit 305 generates the action plan so that the lane change from the current lane LN22 to another lane LN23 is completed before a time point (t=t14) when the subject vehicle 101 reaches the point P22. In FIG. 5, a driving path of the subject vehicle 101 from the time t10 to the time t14 is indicated by a broken line arrow.

Even though the determination unit 301 determines that the subject vehicle 101 needs to change a lane on the specific branching road SR2, when a length of the adjacent section on the specific branching road SR2 is smaller than a predetermined distance D31, the decision unit 302 determines that an automatic lane change (first lane change and second lane change) is not possible, and decides the mode of lane change to be the manual lane change mode. As a result, the occupant of the subject vehicle 101 is urged via the input/output device 3 to manually change the lane. Thereafter, before the subject vehicle 101 reaches the point P21, the drive mode is switched to the manual drive mode by the decision unit 302.

In addition, at a time point (t=t13) when the first lane change in the automatic lane change mode is completed, when a remaining distance from the subject vehicle 101 to the branch end position (point P22) is smaller than a fifth predetermined distance (predetermined distance D32), the decision unit 302 determines that the second lane change cannot be performed automatically, and the occupant of the subject vehicle 101 is urged via the input/output device 3 to manually change the lane. Thereafter, the decision unit 302 switches the drive mode of the subject vehicle 101 to the manual drive mode. As a result, the second lane change is manually performed.

On the specific branching road SR2 illustrated in FIG. 5, when the decision unit 302 decides the modes of first lane change and second lane change to be the specific lane change mode, the recommendation unit 303 starts notification of recommendation information from a position away from the point P22, which is a branch end position, by a predetermined distance D33 (>the length of the adjacent section) toward the opposite side of the traveling direction. In addition, on the specific branching road SR2 illustrated in FIG. 5, the approval limit position is set to a position before the point P22, which is a branch end position, by a predetermined distance D34. The predetermined distance D34 is set in advance to a length enough to complete the lane change in good time before the subject vehicle 101 reaches the branch end position.

Furthermore, on the specific branching road SR2 illustrated in FIG. 5, an example in which one lane (third lane) is provided between the first lane and the second lane has been described, but even in a case where a plurality of lanes are provided between the first lane and the second lane, a lane change is controlled in a similar manner, so that the lane change can be smoothly performed in the adjacent section.

In addition, in the above-described embodiment, the determination unit 301 determines whether a branching road is included in a target route calculated by the navigation unit 6. However, the determination unit may determine whether a branching road is included in a target route of the subject vehicle 101 based on a current position and a destination of the subject vehicle 101 by using map information stored in the map database 5 or the memory unit 12.

In addition, in the above-described embodiment, the example in which the approval limit position or the like in the specific lane change mode is set to the branch end position (the point P12 in FIG. 2B) has been described. However, a steering assistance give-up position in the specific lane change mode may also be similarly set based on the branch end position. The give-up of the steering assistance is processing of canceling driving assistance when a state (standby state) in which a lane change cannot be started due to a road condition or the like of a destination lane continues although an approval operation for the lane change has been received. The give-up position is set to a position before the branch end position (the point P12 in FIG. 2B) by a predetermined distance (<the third predetermined distance). For example, in a case where a plurality of other vehicles are traveling in the lane LN13 of FIG. 2B, and there is a possibility that an inter-vehicle distance between the subject vehicle 101 and any of those other vehicles cannot be sufficiently secured when the subject vehicle moves to the lane LN13, the subject vehicle 101 stands by to start the lane change. Thereafter, when the subject vehicle 101 in the stand-by state reaches the give-up position, the steering assistance is canceled. Similarly to the approval limit position, the give-up position may be changed according to the traveling speed of the subject vehicle 101 when the traveling speed of the subject vehicle 101 at a recommendation start time (t=t0) is equal to or higher than a predetermined speed.

In addition, in the above-described embodiment, although the vehicle control system 100 is applied to a self-driving vehicle, the vehicle control system 100 is also applicable to a vehicle other than the self-driving vehicle. For example, the vehicle control system 100 can also be applied to a manually driven vehicle including advanced driver-assistance systems (ADAS).

The above embodiment can be combined as desired with one or more of the above modifications. The modifications can also be combined with one another. According to the present invention, a lane change can be performed smoothly on a branching road.

Above, while the present invention has been described with reference to the preferred embodiments thereof, it will be understood, by those skilled in the art, that various changes and modifications may be made thereto without departing from the scope of the appended claims.

What is claimed is:
1. A vehicle control apparatus comprising:
an input device configured to receive an operation by an occupant of a subject vehicle;
an output device configured to provide information to the occupant visually and audibly;
a microprocessor and a memory coupled to the microprocessor; and
the microprocessor is configured to perform:
acquiring a target route of the subject vehicle traveling in a self-drive mode from map information based on a current position and a destination of the subject vehicle;
determining based on the target route whether a lane change is necessary to change a traveling lane of the subject vehicle from a first lane in which the subject vehicle is currently traveling to a second lane;
generating an action plan so that the subject vehicle moves from the first lane to the second lane when it is determined that the lane change is necessary;
notifying the occupant via the output device of recommendation information for recommending the lane change to the occupant when a mode of the lane change is a first mode in which the lane change is automatically performed based on the action plan; and
when receiving an approval operation in response to the recommendation of the lane change from the occupant via the input device, controlling an actuator for traveling, based on the action plan, wherein
the target route includes a specific road in which the second lane is separated from the first lane up to a first point ahead of the current position in a traveling direction, the second lane is adjacent to the first lane from the first point to a second point ahead of the first point in the traveling direction, and the second lane is separated from the first lane again behind the second point, and the action plan is a first action plan;

the microprocessor is configured to perform:

the generating including, when it is determined that the lane change is necessary on the specific road, generating the first action plan so that the lane change is performed in a section from the first point to the second point, and the lane change is started from a position away from the first point by a first predetermined distance ahead in the traveling direction;

the generating further including, when the approval operation is not received before a distance between the subject vehicle and the second point becomes smaller than a third predetermined distance, generating a second action plan so that the subject vehicle continues to travel in the first lane; and the controlling including controlling the actuator based on the first action plan or the second action plan.

2. The vehicle control apparatus according to claim 1 wherein the microprocessor is configured to further perform:

deciding the mode of the lane change to be the first mode when a length of the section from the first point to the second point is equal to or greater than a second predetermined distance, and deciding the mode of the lane change to be a second mode in which the lane change is manually performed according to a driving operation of the occupant when the length of the section from the first point to the second point is smaller than the second predetermined distance;

the microprocessor is configured to perform when the mode of the lane change is the second mode, the controlling including controlling the actuator according to the driving operation of the occupant.

3. The vehicle control apparatus according to claim 2, wherein the microprocessor is configured to perform the notifying including, when the mode of the lane change is decided to be the first mode, starting a notification of the recommendation information when the subject vehicle reaches a position before the second point by a fourth predetermined distance, and the fourth predetermined distance is longer than a distance from the first point to the second point.

4. The vehicle control apparatus according to claim 3, wherein the microprocessor is configured to perform the generating including increasing the third predetermined distance as a travel speed of the subject vehicle at the position before the second point by the fourth predetermined distance is greater.

5. The vehicle control apparatus according to claim 3, wherein the specific road is a first specific road, the target route includes a second specific road in which the second lane is separated from the first lane up to a third point ahead of the current position in the traveling direction, the second lane is adjacent to a third lane adjacent to the first lane from the third point to a fourth point ahead of the third point in the traveling direction, and the second lane is separated from the third lane behind the fourth point, and the microprocessor is configured to perform the generating including, when it is determined that a lane change is necessary to change the traveling lane of the subject vehicle from the first lane to the second lane on the second specific road, generating the action plan so that a first lane change in which the subject vehicle moves from the first lane to the third lane and a second lane change in which the vehicle moves from the third lane to the second lane are performed in a section from the third point to the fourth point, and the first lane change is started from a position away from the third point by the first predetermined distance ahead in the traveling direction.

6. The vehicle control apparatus according to claim 5, wherein the microprocessor is configured to perform the deciding including, when a remaining distance from the subject vehicle to the fourth point is smaller than a fifth predetermined distance at a time point when the first lane change is completed, deciding a mode of the second lane change to be the second mode.

7. The vehicle control apparatus according to claim 5, wherein the microprocessor is configured to perform:

the generating further including, even though the mode of the lane change is decided to be the first mode, when the approval operation is not received before a distance between the subject vehicle and the fourth point becomes smaller than a sixth predetermined distance longer than the fifth predetermined distance, generating the second action plan so that the subject vehicle continues to travel in the first lane.

8. A vehicle control apparatus comprising:

an input device configured to receive an operation by an occupant of a subject vehicle;

an output device configured to provide information to the occupant visually and audibly;

a microprocessor and a memory coupled to the microprocessor; and the microprocessor is configured to function as:

a determination unit configured to acquire a target route of the subject vehicle traveling in a self-drive mode from map information based on a current position and a destination of the subject vehicle to determine based on the target route whether a lane change is necessary to change a traveling lane of the subject vehicle from a first lane in which the subject vehicle is currently traveling to a second lane;

a generation unit configured to generate an action plan so that the subject vehicle moves from the first lane to the second lane when it is determined by the determination unit that the lane change is necessary;

a recommendation unit configured to notify the occupant via the output device of recommendation information for recommending the lane change to the occupant when a mode of the lane change is a first mode in which the lane change is automatically performed based on the action plan; and an actuator control unit configured to, when the input device receives an approval operation in response to the recommendation of the lane change from the occupant, control an actuator for traveling based on the action plan generated by the generation unit, wherein the target route includes a specific road in which the second lane is separated from the first lane up to a first point ahead of the current position in a traveling direction, the second lane is adjacent to the first lane from the first point to a second point ahead of the first point in the traveling direction, and the second lane is separated from the first lane again behind the second point, and the action plan is a first action plan;

when it is determined by the determination unit that the lane change is necessary on the specific road, the generation unit generates the action plan so that the lane change is performed in a section from the first point to the second point, and the lane change is started from a position away from the first point by a first predetermined distance ahead in the traveling direction;

the generation unit further, when the approval operation is not received before a distance between the subject vehicle and the second point becomes smaller than a third predetermined distance, generates a second action plan so that the subject vehicle continues to travel in the first lane; and the actuator control unit controls the actuator based on the first action plan or the second action plan.

9. The vehicle control apparatus according to claim 8, wherein the microprocessor is configured to further function as:

a decision unit configure to decide the mode of the lane change to be the first mode when a length of the section from the first point to the second point is equal to or greater than a second predetermined distance, and decide the mode of the lane change to be a second mode in which the lane change is manually performed according to a driving operation of the occupant when the length of the section from the first point to the second point is smaller than the second predetermined distance, wherein when the mode of the lane change is the second mode, the actuator control unit controls the actuator according to the driving operation of the occupant.

10. The vehicle control apparatus according to claim 9, wherein when the mode of the lane change is decided to be the first mode by the decision unit, the recommendation unit starts a notification of the recommendation information when the subject vehicle reaches a position before the second point by a fourth predetermined distance, and the fourth predetermined distance is longer than a distance from the first point to the second point.

11. The vehicle control apparatus according to claim 10, wherein the generation unit increases the third predetermined distance as a travel speed of the subject vehicle at the position before the second point by the fourth predetermined distance is greater.

12. The vehicle control apparatus according to claim 10, wherein the specific road is a first specific road, the target route includes a second specific road in which the second lane is separated from the first lane up to a third point ahead of the current position in the traveling direction, the second lane is adjacent to a third lane adjacent to the first lane from the third point to a fourth point ahead of the third point in the traveling direction, and the second lane is separated from the third lane behind the fourth point, and when it is determined by the determination unit that a lane change is necessary to change the traveling lane of the subject vehicle from the first lane to the second lane on the second specific road, the generation unit generates the action plan so that a first lane change in which the subject vehicle moves from the first lane to the third lane and a second lane change in which the vehicle moves from the third lane to the second lane are performed in a section from the third point to the fourth point, and the first lane change is started from a position away from the third point by the first predetermined distance ahead in the traveling direction.

13. The vehicle control apparatus according to claim 12, wherein when a remaining distance from the subject vehicle to the fourth point is smaller than a fifth predetermined distance at a time point when the first lane change is completed, the decision unit decides a mode of the second lane change to be the second mode.

* * * * *